US008139538B1

(12) United States Patent
Patel et al.

(10) Patent No.: US 8,139,538 B1
(45) Date of Patent: Mar. 20, 2012

(54) METHODS AND APPARATUS FOR ACHIEVING ROUTE OPTIMIZATION BETWEEN MOBILE NETWORKS AND A CORRESPONDENT NODE USING A MOBILE ROUTER AS A PROXY NODE

(75) Inventors: Alpesh Patel, Santa Clara, CA (US); Gopal Dommety, San Jose, CA (US); Kent Leung, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1851 days.

(21) Appl. No.: 10/874,650

(22) Filed: Jun. 22, 2004

(51) Int. Cl.
*H04W 4/00* (2009.01)
*H04L 12/28* (2006.01)

(52) U.S. Cl. .................... 370/331; 370/401; 370/409

(58) Field of Classification Search .............. 370/400, 370/392, 328, 409, 401; 709/239, 242, 238
See application file for complete search history.

(56) References Cited

U.S. PATENT DOCUMENTS

| | | | | |
|---|---|---|---|---|
| 6,636,498 | B1 * | 10/2003 | Leung | 370/338 |
| 7,162,529 | B2 * | 1/2007 | Morishige et al. | 709/230 |
| 2003/0095523 | A1 * | 5/2003 | Korus et al. | 370/338 |
| 2004/0095913 | A1 * | 5/2004 | Westphal | 370/338 |
| 2004/0228343 | A1 * | 11/2004 | Molteni et al. | 370/392 |
| 2005/0099971 | A1 * | 5/2005 | Droms et al. | 370/328 |
| 2006/0120315 | A1 * | 6/2006 | Olivereau et al. | 370/313 |
| 2006/0171370 | A1 * | 8/2006 | Matsumoto et al. | 370/351 |

OTHER PUBLICATIONS

D. Johnson, "Mobility Support in IPv6," Jan. 20, 2003, IETF Mobile IP Working Group, Draft 20, p. 19-25,30.*
P. Thubert, "IPv6 Reverse Routing Header and its application to Mobile Networks," Oct. 11, 2002, Draft 1, p. 8.*
Pankaj Gupta, "Routing Lookups in Hardware at memory Access Speeds," 1998, IEEE, 0-7803-4383-2/98, p. 1.*
Eranga Perera, "Survey on Network Mobility Support," Apr. 2004, ACM SIGMOBILE Mobile Computing and Communication Review, vol. 8 issue 2, pp. 7-19.*
P. Thubert, "Taxonomy of Route Optimization Models in the Nemo Context," Feb. 15, 2004, Network Working Group, pp. 1-19.*
C. Perkins, "*IP Mobility Support*," RFC 2002, Oct. 1996, 73 pages.

(Continued)

*Primary Examiner* — Dang Ton
*Assistant Examiner* — Ryan Kavleski
(74) *Attorney, Agent, or Firm* — Weaver Austin Villeneuve & Sampson LLP (57) ABSTRACT

Methods and apparatus for establishing an optimized route between a node and a Correspondent Node are disclosed. In a Mobile Router supporting Mobile IP, the Mobile Router having one or more networks associated therewith, a method of establishing a route between one or more nodes associated with one of the networks of the Mobile Router and a Correspondent Node includes composing a HOTI message on behalf of at least one of the nodes, which is sent from the Mobile Router to a Correspondent Node via a Home Agent supporting the Mobile Router. The Mobile Router sends a COTI message to the Correspondent Node on behalf of the node. The Mobile Router receives a HOT message from the Correspondent Node. It then receives a COT message from the Correspondent Node, thereby enabling a binding between the node(s) and the Correspondent Node to be generated such that data packets transmitted between the node(s) and the Correspondent Node can be routed between the node(s) and the Correspondent Node without being routed via the Home Agent.

33 Claims, 9 Drawing Sheets

OTHER PUBLICATIONS

D. Johnson, et al, "*Mobility Support in IPv6*," RFC 3775, Jun. 2004, 129 pages.

J. Arkko, et al., "*Using IPsec to Protect Mobile IPv6 Signaling Between Mobile Nodes and Home Agents*," RFC 3776, Jun. 2004, 32 pages.

V. Devarapalli, R. Wakikawa, A. Petrescu, and P. Thubert, "*Network Mobility (NEMO) Basic Support Protocol*," RFC 3963, Jan. 2005, 26 pages.

A. Patel, et al, "*Methods and Apparatus for Implementing Mobile IPv6 Route Optimization Enhancements*," U.S. Appl. No. 11/129,265, filed May 12, 2005.

A. Patel, et al, "*Methods and Apparatus for Achieving Route Optimization and Location Privacy in an IPv6 Network*," U.S. Appl. No. 10/898,579, filed Jul. 23, 2004.

* cited by examiner

METHODS AND APPARATUS FOR ACHIEVING ROUTE OPTIMIZATION BETWEEN MOBILE NETWORKS AND A CORRESPONDENT NODE USING A MOBILE ROUTER AS A PROXY NODE

BACKGROUND OF THE INVENTION

The present invention relates to Mobile IP network technology. More specifically, this invention relates to mechanisms for achieving route optimization between mobile networks and a Correspondent Node using a Mobile Router as a proxy node.

Mobile IP is a protocol which allows laptop computers or other mobile computer units (referred to as "Mobile Nodes" herein) to roam between various sub-networks at various locations—while maintaining internet and/or WAN connectivity. Without Mobile IP or a related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

Figure 1A:
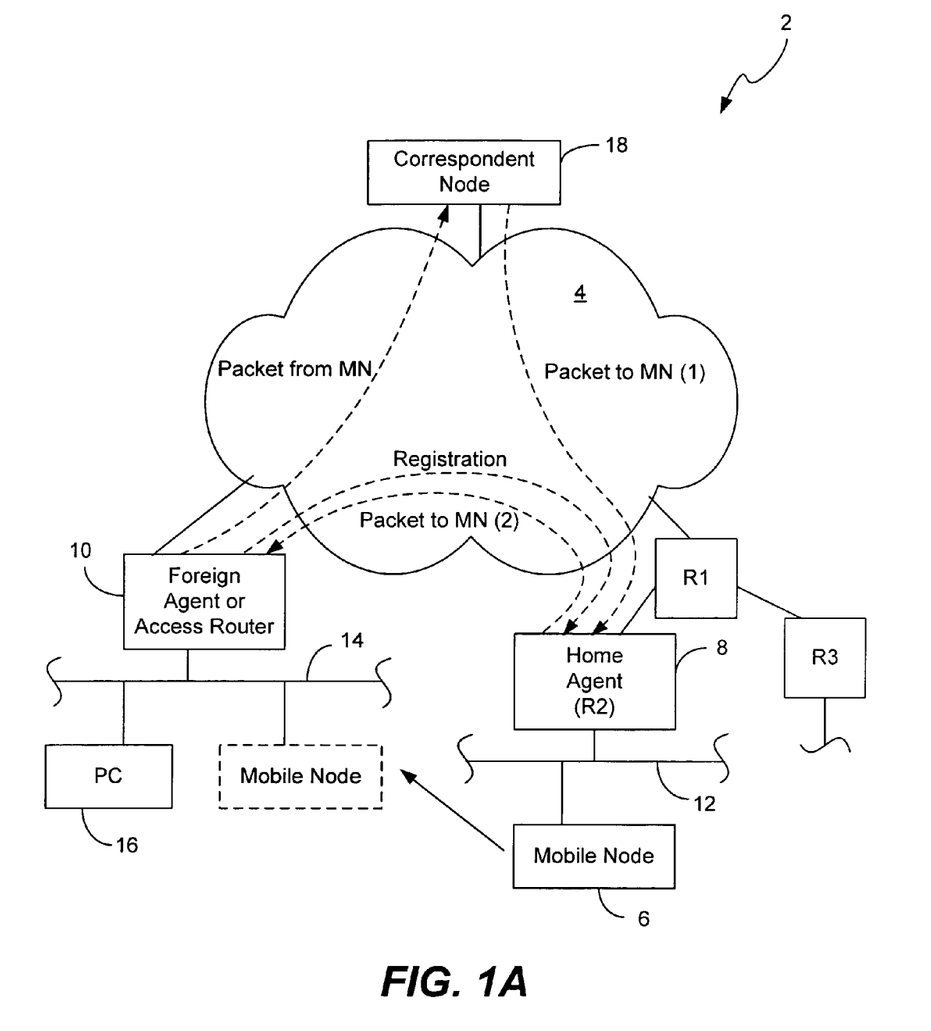
FIG. 1A is a diagram of a Mobile IP network segment and associated environment.

The Mobile IP process in a Mobile Ipv4 environment are illustrated in FIG. 1. As shown there, a Mobile IP environment 2 includes the internet (or a WAN) 4 over which a Mobile Node 6 can communicate remotely via mediation by a Home Agent 8 and may also include a Foreign Agent 10. In the absence of a Foreign Agent, the Mobile Node 6 can obtain a topologically correct IP address (i.e., collocated IP address) and register this IP address with the Home Agent. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1A, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a Correspondent Node 18 from its new location. In Mobile IPv4, a message from the Mobile Node is then packetized and forwarded through Foreign Agent 10 over the internet 4 and to Correspondent Node 18 (as indicated by the dotted line "packet from MN") according to a standard internet protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling." In the absence of a Foreign Agent, packets are tunneled directly to the Mobile Node 6 collocated care-of address.

The Mobile IP protocol for Ipv6 has been described in RFC 3775, entitled "Mobility Support in Ipv6," published in June 2004, by Johnson et al. RFC 3775 was previously published as the Internet-Draft "Mobility Support in Ipv6," published on Jun. 30, 2003, by D. Johnson et al. RFC 3775 discloses a protocol which allows nodes to remain reachable while roaming in IPv6. Both RFC 3775 and the corresponding Internet-Draft are incorporated herein by reference for all purposes. As disclosed in "Mobility Support in IPv6," the Home Agent generally advertises its address, which is obtained by a Mobile Node. In Mobile Ipv6, there is no Foreign Agent. However, an access router 10 is present to provide connectivity to the network. The Mobile Node then sends a Binding Update message to the Home Agent. The Home Agent then sends a Binding Acknowledgement message to the Mobile Node. The Home Agent creates a binding cache entry and a tunnel is established between the Mobile Node and the Home Agent. When a Correspondent Node sends a packet to the Mobile Node, it is forwarded to the Mobile Node by the Home Agent via the tunnel that has been established.

Since the Correspondent Node is generally unaware of movement of the Mobile Node, packets continue to be forwarded from the Correspondent Node to the Mobile Node via the Home Agent. As a result, packets are routed inefficiently. In order to optimize the route via which packets are routed from the Correspondent to the Mobile Node, it is desirable to enable the Correspondent Node to communicate directly with the Mobile Node. This is generally accomplished using a method termed "Route Optimization" as set forth in RFC 3775. First, through two sets of messages (HOT, HOTi, COT, and COTi), described in further detail below, the Mobile Node and the Correspondent Node generate a shared secret key. Second, the Mobile Node sends a Binding Update message to the Correspondent Node to enable the Correspondent Node to send packets directly to the Mobile Node.

In addition to providing connectivity to a Mobile Node, it may be desirable to provide for the mobility of one or more networks moving together, such as on an airplane or a ship. RFC 2002 section 4.5 discusses the possibility of implementing Mobile Routers.

Figure 1B:
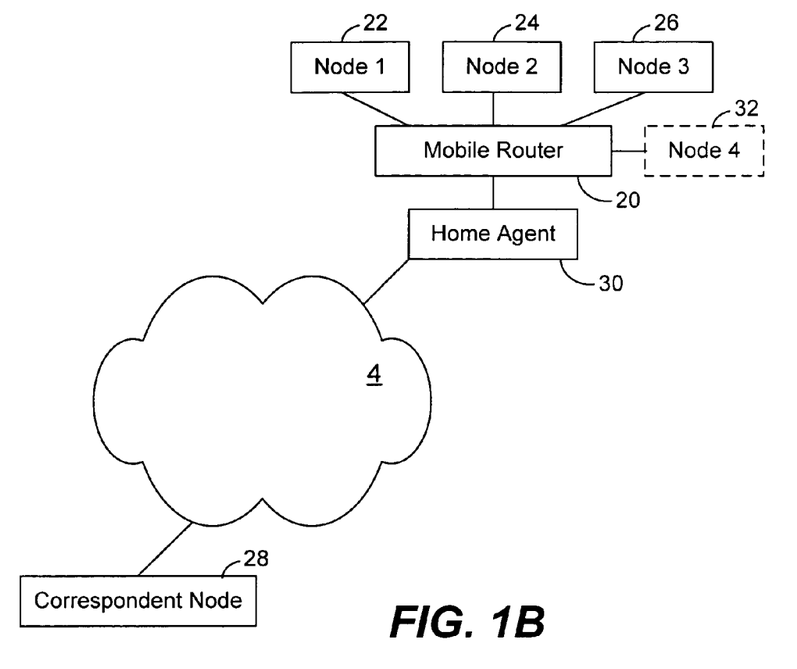
FIG. 1B is a diagram of a Mobile IP mobile router and associated environment in which a Home Agent is configured to have a permanent registration for each fixed node that indicates the mobile router's address as the care-of address.

In one approach suggested in RFC 2002 section 4.5, a Home Agent is configured to have a permanent registration for each fixed node. FIG. 1B is a diagram of a Mobile IP mobile router and associated environment in which a Home Agent is configured to have a permanent registration for each fixed node. As shown, a Mobile Router 20 may support multiple nodes 22, 24, 26 which may be fixed with respect to the Mobile Router 20. In order to receive communication from a Correspondent Node 28, messages must be routed to the appropriate fixed node 22, 24, or 26. As the RFC suggests, a Home Agent 30 may be configured to have a permanent registration for each fixed node. By way of example, the permanent registration may indicate the Mobile Router's address as the care-of address. Thus, a separate mapping table may associate the IP address of each of the fixed nodes 22, 24, and 26 with the mobile router 20. However, this is problematic since the mapping table is typically configured while the Mobile Router 20 is coupled to the Home Agent 30. In other words, the routing table is static. Suppose a person boards an airplane and wishes to connect a laptop to the airplane's "mobile network" via the Mobile Router 20. If a new node 32 is added to the Mobile Router 20 after the airplane leaves the airport, the IP address of this new node may not be added to the mapping table. As a result, communication cannot be received by this new node 32 via the Mobile Router 20. In addition, since the Mobile Router 20 may accommodate thousands of devices, or nodes, there would potentially be an enormous number of entries to store in such a mapping table for these nodes. Moreover, such a mapping table may include entries for multiple Mobile Routers. Accordingly, such a mapping table would consume a substantial amount of memory as well as be cumbersome to search.

Figure 1C:
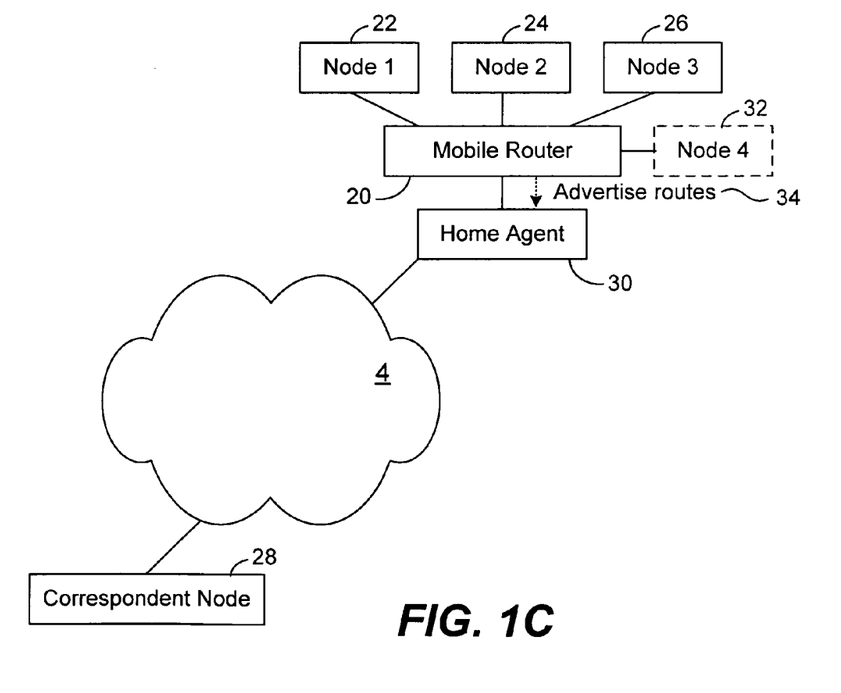
FIG. 1C is a diagram of a Mobile IP mobile router and associated environment in which the mobile router advertises connectivity to each mobile network associated with the mobile router.

In another approach suggested in RFC 2002, the Mobile Router 20 may advertise connectivity to the entire "mobile network." FIG. 1C is a diagram of a Mobile IP Mobile Router and associated environment in which the Mobile Router advertises 34 connectivity to each node associated with the Mobile Router. The RFC states that this may be performed using normal IP routing protocols through a bi-directional tunnel to its Home Agent 30. However, the RFC provides no implementation details.

Figure 2:
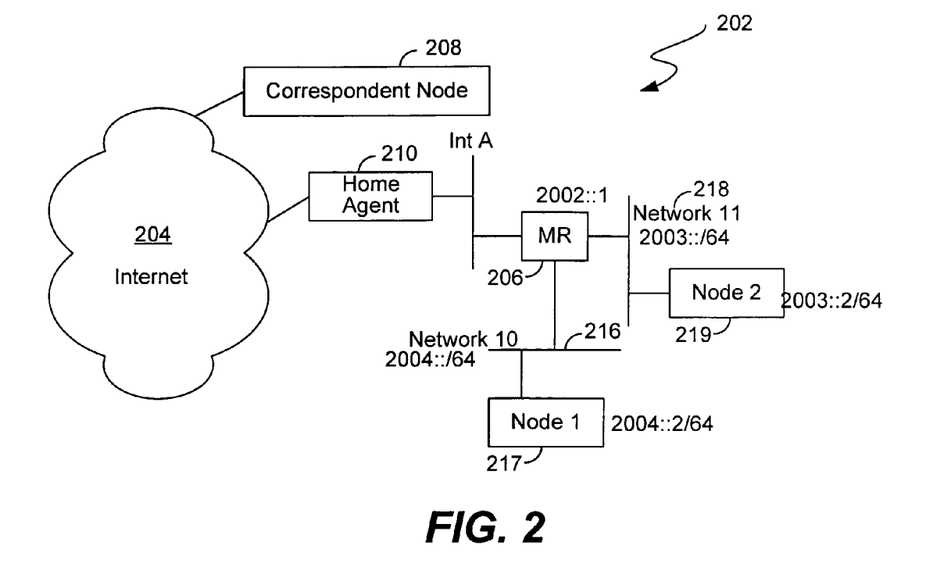
FIG. 2 is a diagram illustrating a Mobile IP mobile router and associated environment in which the mobile router is stationed at the Home Agent.

U.S. Pat. No. 6,636,498, entitled "Mobile IP MobileRouter," by K. Leung, issued on Oct. 32, 2003, discloses a method of implementing a Mobile IP Mobile Router, which is incorporated herein by reference for all purposes. FIG. 2 is a diagram illustrating a Mobile IP Mobile Router and associated environment in which the Mobile Router is stationed at the Home Agent. As shown, a Mobile IPv6 environment 202 includes the interne (or a WAN) 204 over which a node such as "node 1" 217 connected to Mobile Router 206 can communicate remotely with a Correspondent Node 208 via mediation by a Home Agent 210. By way of example, the Home Agent 210 may be a network device such as a router or host having Mobile IP capabilities. The Mobile Router 206 may provide connectivity to multiple networks, many or all of which may roam with Mobile Router 206. As shown, the Mobile Router 206 provides connectivity to a first mobile network, "network 10" 216, and a second network, "network 11" 218. The "network 10" 216 and the second network, "network 11" 218, may be mobile networks.

Each network and network device is assigned a unique IP address. IP addresses typically include a network-prefix portion and a host portion. By way of example, the network-prefix of an IPv6 address may consist of the leftmost 64 bits and the host portion may consist of the rightmost 64 bits. Exemplary IP addresses are provided, as shown. In this example, the Home Agent 210 has an IP address 2001::1, the Mobile Router has an IP address 2002::1, the first network 216 has an IP address 2003::/64 and the second network has an IP address 2004::/64. A 64-bit mask may be used to specify the entire Ipv6 address (e.g., 2004::/64). Alternatively, a mask may be used to exclude the rightmost 64 bits of the network addresses that are associated with the mobile router supported networks, as shown. In this manner, the network portion of the IP addresses may be used in routing decisions to route packets to nodes 217 and 219, identified by IP addresses 2004::2/64 and 2003::2/64, respectively.

The Internet-Draft entitled "Network Mobility (NEMO) Basic Support Protocol," by Devarapalli et al, published in June 2004, describes the Network Mobility (NEMO) Basic Support protocol that enables mobile networks to attach to different points in the Internet. The NEMO draft is incorporated herein by reference for all purposes. The protocol is an extension of Mobile IPv6 and allows for session continuity for every node in the mobile network as the network moves. It also allows every node in the mobile network to be reachable as the network moves. The Mobile Router, which connects the network to the Internet, runs the NEMO Basic Support protocol. The protocol is designed in such a way that network mobility is transparent to the nodes inside the mobile network. However, the NEMO draft does not provide a solution for route optimization in communications between a Correspondent Node and nodes attached to a Mobile Router.

As described above, when the Mobile Node is a Mobile Router, there are mobile networks attached to the Mobile Router. However, the nodes on these mobile networks need not or may not be MIPv6 enabled. In such a case, the traffic from mobile networks must be forwarded to the mobile networks via the Home Agent. Since the nodes need not or may not be MIPv6 enabled, a tunnel cannot be directly established between the Correspondent Node and the nodes on the mobile networks. Similarly, the nodes on the mobile networks are unable to send a Binding Update message to the Correspondent Node to enable the Correspondent Node to send packets directly to the Mobile Node.

In view of the above, it would be beneficial if route optimization could be achieved between mobile networks of a Mobile Router and a Correspondent Node.

SUMMARY OF THE INVENTION

Methods and apparatus for establishing an optimized route between a node supported by a Mobile Router and a Correspondent Node are disclosed. Specifically, a proxy node such as a Mobile Router having one or more networks initiates a return routability check on behalf of one or more nodes associated with one or more of the networks of the Mobile Router with the Correspondent Node(s) with which the node is communicating. In this manner, the Mobile Router may initiate the establishment of an optimized route enabling communication between a node and a Correspondent Node without requiring traffic to be routed via a Home Agent.

In accordance with one aspect of the invention, methods and apparatus for enabling a Mobile Router to initiate and support route optimization between at least one of the nodes associated with the Mobile Router and a Correspondent Node are disclosed. The method is preferably implemented by a proxy node such as a Mobile Router supporting Mobile IP, where the Mobile Router has one or more networks associated therewith. A method of establishing a route between one or more nodes associated with one of the networks of the Mobile Router and a Correspondent Node includes composing a Home Test Init (HOTI) message on behalf of one of the nodes, which is sent from the Mobile Router to a Correspondent Node via a Home Agent supporting the Mobile Router. This may be accomplished, for example, by identifying the node as the Home Address in the HOTI message. Alternatively, the Mobile Router may append a network prefix identifying a mobile network associated with the Mobile Router. The Mobile Router sends a Care of Test Init (COTI) message to the Correspondent Node on behalf of the node. The Mobile Router receives a Home Test (HOT) message from the Correspondent Node via the Home Agent. It then receives a Care-of Test (COT) message from the Correspondent Node. The Mobile Router then sends a Binding Update message to the Correspondent Node to create a binding cache entry at the Correspondent Node, thereby enabling a binding between the node(s) and the Correspondent Node to be generated such that data packets transmitted between the node(s) and the Correspondent Node can be routed between the node(s) and the Correspondent Node without being routed via the Home Agent.

In accordance with another aspect of the invention, the Mobile Router intercepts data packets transmitted by the Correspondent Node to a node supported by the Mobile Router. Specifically, the Mobile Router receives a data packet from the Correspondent Node, where the data packet includes a Routing Header, type 2 (RH2) option identifying a Home Address of the node. The Mobile Router removes the RH2 option from the data packet. The Mobile Router then modifies the destination address of the data packet to the Home Address of the node. The data packet is then forwarded to the Home Address of the node.

In accordance with yet another aspect of the invention, the Mobile Router intercepts data packets transmitted from a node supported by the Mobile Router to the Correspondent Node. Specifically, the Mobile Router intercepts a data packet sent from the node to the Correspondent Node. The Mobile Router adds a Home Address destination option identifying a Home Address of the node (e.g., obtained from the source address field of the packet) to the data packet. A source address of the data packet is then modified to a Home Address of the Mobile Router. The data packet is then forwarded to the Correspondent Node.

In accordance with another aspect of the invention, the invention pertains to a system operable to perform and/or initiate route optimization between a node or network supported by a Mobile Router and a Correspondent Node. The system includes one or more processors and one or more memories. At least one of the memories and processors are adapted to provide at least some of the above described method operations. In yet a further embodiment, the invention pertains to a computer program product for performing the disclosed methods. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures, which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order to not unnecessarily obscure the present invention.

In order to support one or more networks, the Mobile Router registers with a Home Agent in order to establish a binding between the Mobile Router and the Home Agent. Thus, when the Mobile Router registers with the Home Agent, the Home Agent is aware of the care-of address of the Mobile Router and the mobile network prefixes that it supports. The Mobile Router then initiates route optimization on behalf of a node or network supported by the Mobile Router.

Embodiments of the invention enable a Mobile Router to initiate route optimization on behalf of a node. In the following description, the term "node" will be used to refer to a network device that need not support Mobile IP. A node that supports Mobile IP will be referred to as a Mobile Node. In accordance with the embodiments of the invention described herein, the node may be a Mobile Node. However, this is not a requirement. Accordingly, the Mobile Router may initiate proxy route optimization on behalf of the node without verifying whether the node supports Mobile IP.

As will be described in further detail below, the Mobile Router may initiate route optimization on behalf of a node or network supported by the Mobile Router. The node need not be Mobile IP enabled. Accordingly, the Mobile Router need not check whether the node supports Mobile IP in order to initiate and establish route optimization on behalf of the node.

Figure 3:
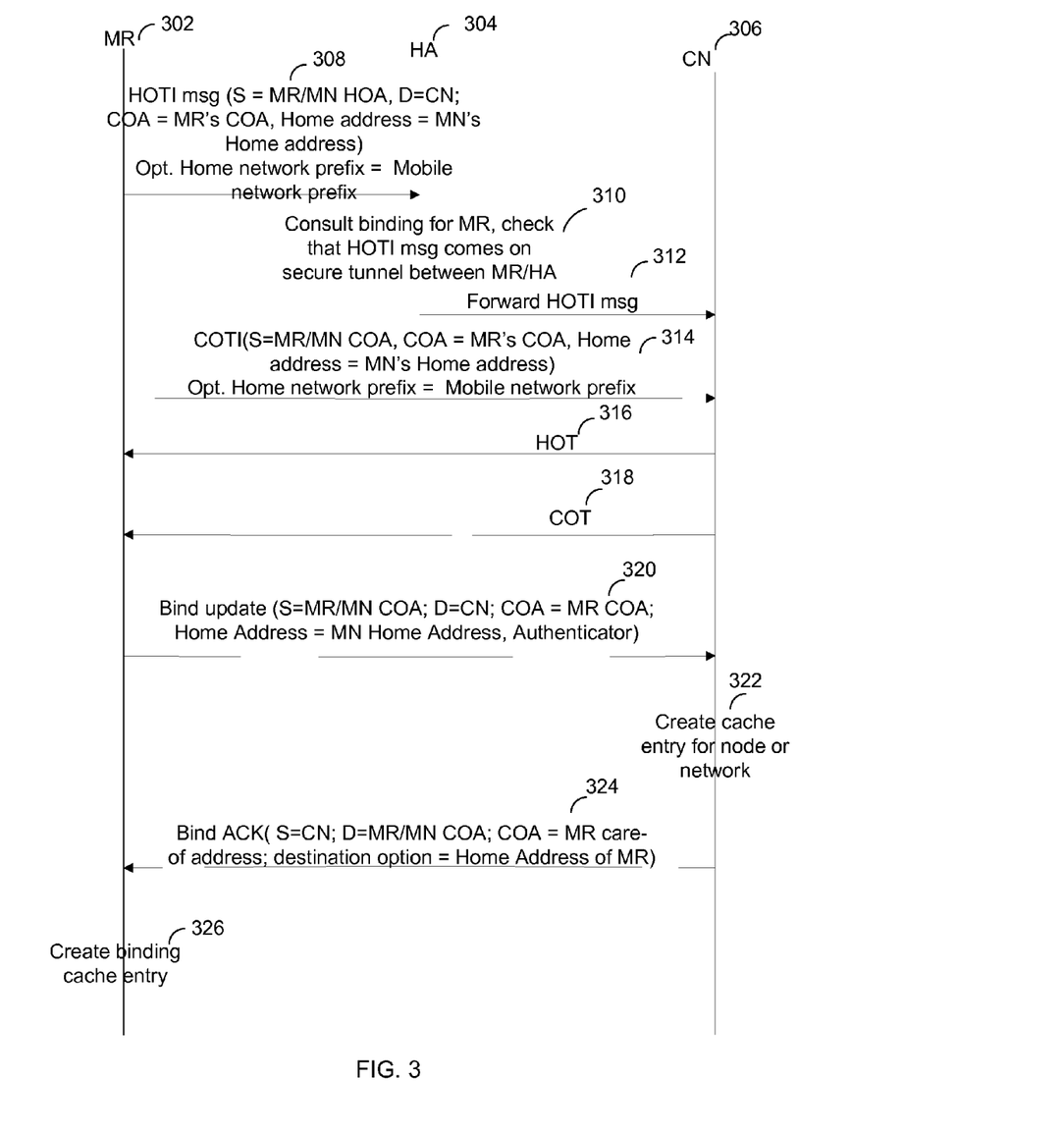
FIG. 3 is a transaction flow diagram illustrating a method of achieving route optimization between mobile networks and a Correspondent Node using the Mobile Node as a proxy node in accordance with one embodiment of the invention.

FIG. 3 is a transaction flow diagram illustrating a method of achieving route optimization between mobile networks and a Correspondent Node using the Mobile Node as a proxy node in accordance with one embodiment of the invention. As shown in FIG. 3, the steps performed by the Mobile Router (MR), Home Agent (HA) and Correspondent Node (306) are represented by vertical lines, 302, 304, 306, respectively. In order to initiate a return routability check, a Mobile Router supporting Mobile IP and having one or more networks associated therewith composes a Home Test Init (HOTI) message on behalf of at least one of the nodes and sends the HOTI message to a Correspondent Node via a Home Agent supporting the Mobile Router as shown at 308. As shown, the HOTI message includes a care-of address field identifying a care-of address of the Mobile Router and a Home Address field identifying a Home Address of one of the nodes. In addition, the source address identifies the Home Address of the Mobile Router, while the destination address identifies the address of the Correspondent Node. The HOTI message may also include a home network prefix identifying a network prefix of the Mobile Router, thereby enabling a binding to be created between the network prefix and the Correspondent Node. In this manner, the Mobile Router may generate a binding between the Correspondent Node and multiple nodes supported by the Mobile Router.

The Home Agent receives the HOTI message from the Mobile Router at 310. The Home Agent determines whether a binding exists between the Home Agent and the Mobile Router. In addition, the Home Agent may determine whether the source address of the HOTI message is an address of the Mobile Router. Alternatively, the source address may be that of the relevant node. In this instance, the Home Agent determines whether the source address of the HOTI message is the Home Address of a node supported by (i.e., associated with) the Mobile Router. For instance, when the source address of the HOT message is the Home Address of the node, the Home Agent verifies that the tunnel interface or care-of address is that of a Mobile Router that "owns" the relevant node. This can be accomplished by looking up the routing table or binding cache entry associated with the Mobile Router.

The Home Agent forwards the HOTI message to the Correspondent Node when it is determined that a binding exists between the Home Agent and the Mobile Router and the source address of the HOTI message is an address of the Mobile Router. In this manner, the Home Agent ensures that the HOTI message has been received on a secure tunnel established between the Home Agent and the Mobile Router.

The Correspondent Node receives the HOTI message at 312. If the HOTI message includes a home network prefix, the Correspondent Node must be configured to recognize the home network prefix as well as be able to create a binding between the sub-network and the Correspondent Node.

The Mobile Router sends a Care of Test Init (COTI) message to the Correspondent Node at 314 on behalf of at least one of the nodes. The COTI message includes a care-of address field identifying the care-of address of the Mobile Router and a Home Address field identifying the Home Address of the node. In addition, the source address identifies the Home Address of the Mobile Router, while the destination address identifies the address of the Correspondent Node. As described above, the COTI message may also include a home network prefix identifying a network prefix of the Mobile Router, thereby enabling a binding to be created between the network prefix and the Correspondent Node.

The Correspondent Node sends a Home Test (HOT) message to the Mobile Router at 316. The Correspondent Node then sends a Care of Test (COT) message to the Mobile Router at 318, thereby enabling a binding between the node and the Correspondent Node to be generated such that data packets transmitted between the node and the Correspondent Node can be routed between the node and the Correspondent Node without being routed via the Home Agent.

The Mobile Router sends a Binding Update message at 320 to the Correspondent Node. Specifically, the Binding Update message includes a care-of address field identifying a care-of address of the Mobile Router and a Home Address field identifying a home address of the node. If the HOTI and COTI messages included a network prefix, the binding update message also includes the home network prefix, thereby enabling the Correspondent Node to create a binding cache entry for the network prefix. The Binding Update message is authenticated using keys previously set up during HOT, HOTI, COTI, and COT. The Correspondent Node then creates a binding between the Correspondent Node and the node (or network prefix) at 322. Specifically, the Correspondent Node creates a binding cache entry for the node or the network prefix.

The Correspondent Node then sends a Binding Acknowledgement message to the Mobile Router at 324. Specifically, the Binding Acknowledgement message includes a care-of address field identifying a care-of address of the Mobile Router. The Binding Acknowledgement message further includes a destination option indicating that a destination address of the Binding Acknowledgement message is an address of the Mobile Router.

The Mobile Router then creates a binding between the node and the Correspondent Node at 326. Specifically, the Mobile Router creates a binding cache entry. Once the binding has been created, packets may be transmitted between the node and the Correspondent Node without triangular routing via the Home Agent.

Generally, the return routability check is initiated by the Mobile Router. This may be performed automatically or in response to a particular event. For instance, the return routability check (e.g., HOTI message transmission) may be initiated upon intercepting a data packet sent from the node to the Correspondent Node or when receiving a tunneled packet from the Home Agent.

Figure 4:
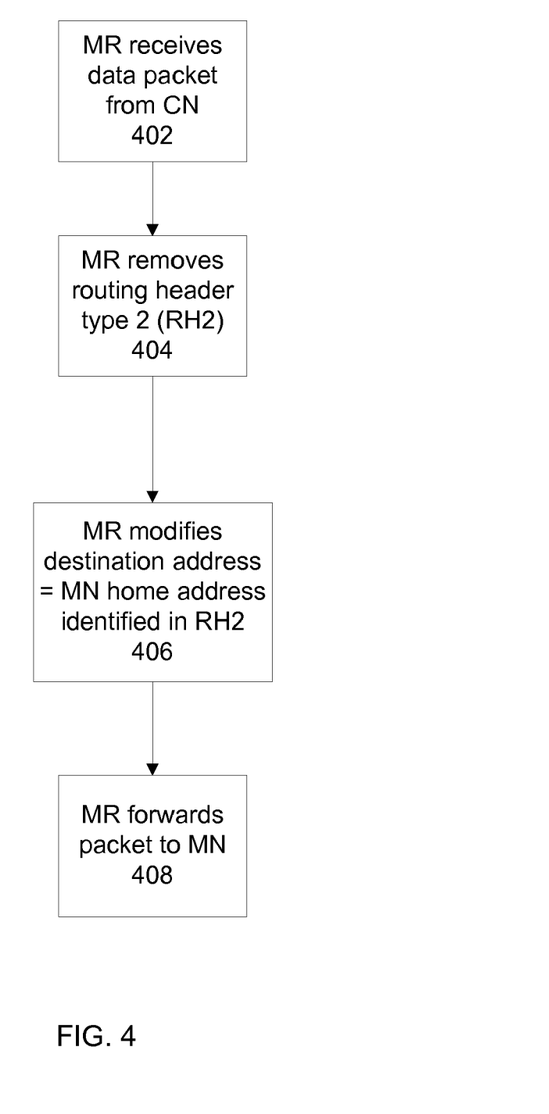
FIG. 4 is a process flow diagram illustrating a method of transmitting a packet from a Correspondent Node to a node supported by the Mobile Router in accordance with one embodiment of the invention.

FIG. 4 is a process flow diagram illustrating a method of transmitting a packet from a Correspondent Node to a node supported by the Mobile Router in accordance with one embodiment of the invention. The Mobile Router receives a data packet from the Correspondent Node at block 402. Specifically, the data packet includes a Routing Header, type 2 (RH2) option containing a Home Address of the node. The Mobile Router removes the RH2 option from the data packet at block 404. The Mobile Router modifies the destination address of the data packet to be the Home Address of the nodes as obtained from the RH2 option of the data packet at block 406. The data packet is then forwarded to the Home Address of the node at block 408.

Figure 5:
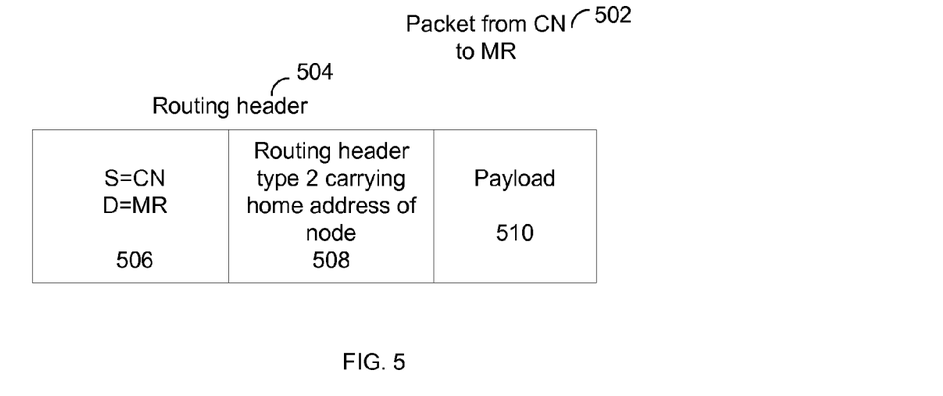
FIG. 5 is a diagram illustrating a simplified packet format of a packet that is transmitted from a Correspondent Node to the Mobile Router in accordance with one embodiment of the invention.

FIG. 5 is a diagram illustrating a simplified packet format of a packet that is transmitted from a Correspondent Node to the Mobile Router in accordance with one embodiment of the invention. The packet 502 includes a routing header 504 having both a source address field including the IP address of the Correspondent Node and a destination address field including the address of the Mobile Router as shown at 506. In addition, the routing header 504 includes a RH2 option 508 as set forth above. The packet 502 also includes payload 510.

Figure 6:
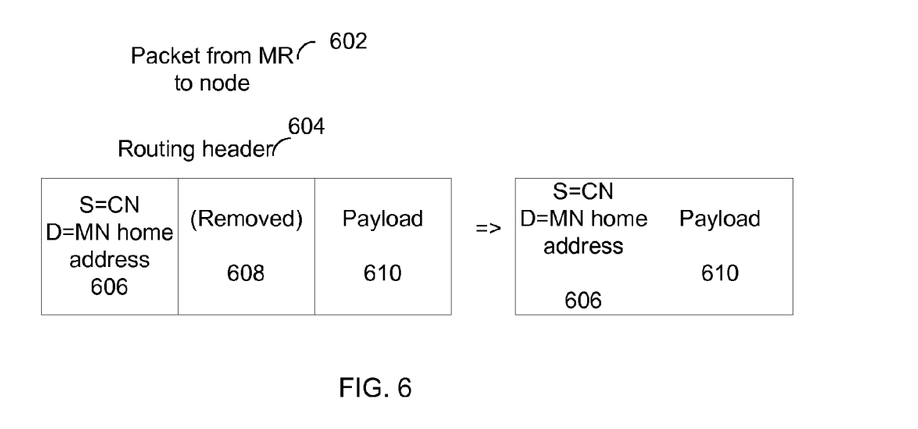
FIG. 6 is a diagram illustrating a simplified packet format of a packet that is transmitted from the Mobile Router to the node after interception by the Mobile Router as a proxy for route optimization in accordance with one embodiment of the invention.

FIG. 6 is a diagram illustrating a simplified packet format of a packet that is transmitted from the Mobile Router to the node after interception by the Mobile Router as a proxy for route optimization in accordance with one embodiment of the invention. The packet 602 includes a routing header 604 having both a source address field including the IP address of the Correspondent Node and a destination address field including a Home Address of the node as shown at 606. As shown, the Mobile Router removes the RH2 option 608. The packet 602 still includes the payload 610.

Figure 7:
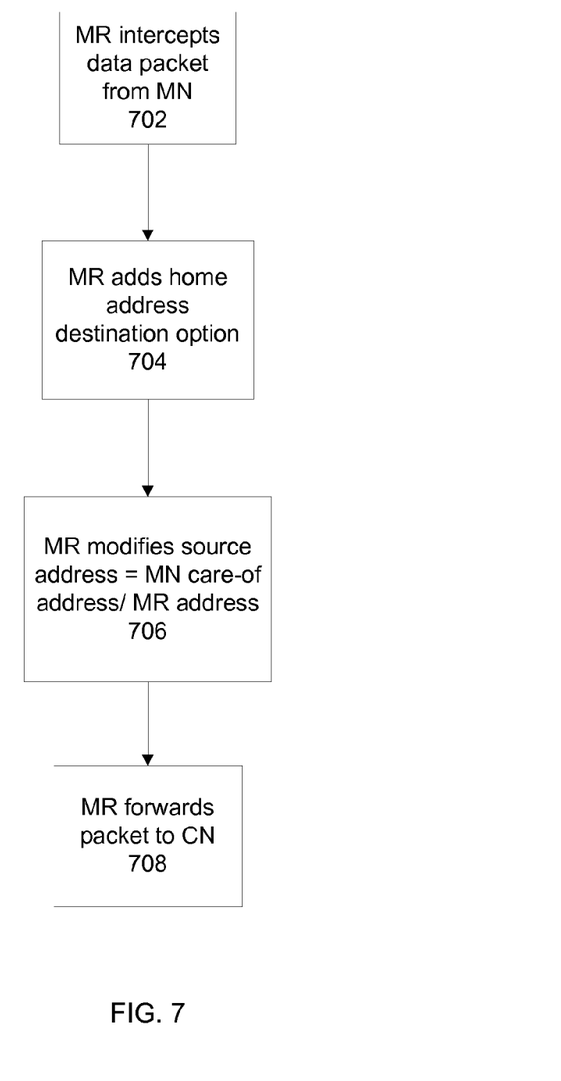
FIG. 7 is a process flow diagram illustrating a method of transmitting a packet from a node supported by the Mobile Router to a Correspondent Node in accordance with one embodiment of the invention.

FIG. 7 is a process flow diagram illustrating a method of transmitting a packet from a node supported by the Mobile Router to a Correspondent Node in accordance with one embodiment of the invention. As shown at block 702, the Mobile Router intercepts a data packet sent from the node to the Correspondent Node. The Mobile Router then adds a Home Address destination option identifying a Home Address of the node (e.g., obtained from the source address field of the packet) to the data packet at block 704. The Mobile Router modifies the source IP address of the data packet to a Home Address of the Mobile Router at block 706, and forwards the modified data packet to the Correspondent Node at block 708.

When the Correspondent Node sends a data packet to a node, it consults its binding cache entry for its optimized route. For instance, the binding cache entry may be matched for a longest prefix match between a network prefix of a destination address and the network prefix identified in the binding cache entry. A data packet may then be sent to the destination address associated with one of the nodes via an optimized route identified in the binding cache entry for that particular network prefix.

Figure 8:
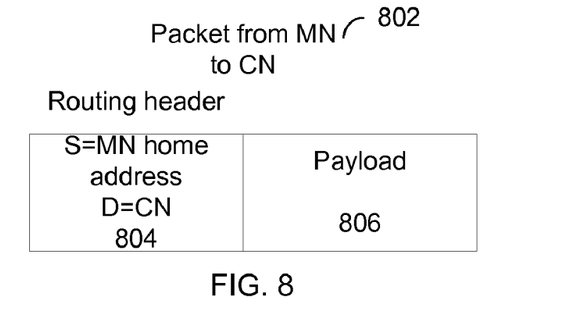
FIG. 8 is a diagram illustrating a simplified packet format of a packet that is transmitted from a node supported by the Mobile Router to the Correspondent Node in accordance with one embodiment of the invention.

FIG. 8 is a diagram illustrating a simplified packet format of a packet that is transmitted from a node supported by the Mobile Router to the Correspondent Node in accordance with one embodiment of the invention. The packet 802 includes a routing header 804 having both a source address field including the IP address of the node and a destination address field including the IP address of the Correspondent Node. The packet 802 also includes payload 806.

Figure 9:
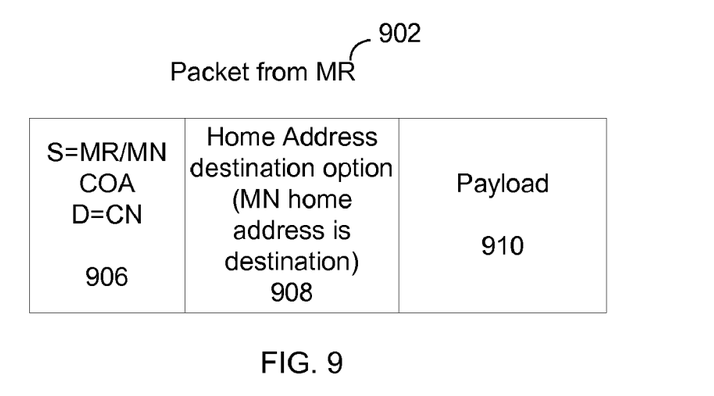
FIG. 9 is a diagram illustrating a simplified packet format of a packet that is transmitted from the Mobile Router to the Correspondent Node after interception by the Mobile Router as a proxy for route optimization in accordance with one embodiment of the invention.

FIG. 9 is a diagram illustrating a simplified packet format of a packet that is transmitted from the Mobile Router to the Correspondent Node after interception by the Mobile Router as a proxy for route optimization in accordance with one embodiment of the invention. The packet 902 includes both a source address field including the IP address of the Mobile Router and a destination address field including the IP address of the Correspondent Node as shown at block 906. The packet 902 further includes a Home Address destination option 908 identifying the Home Address of the node, as well as payload 910.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (e.g. Mobile Node, Mobile Router, Home Agent, or Foreign Agent) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home and Foreign Agents of this invention may be specially configured routers such as specially configured router models 1700, 1800, 2500, 2600, 3200, 3600, 4000, 4500, 4700, 7200, and 7500 available from Cisco Systems, Inc. of San Jose, Calif. In addition, in a preferred embodiment, any of the Access Points of this invention may be specially configured routers such as specially configured router models 350, 1100, 1200 and 1400 available from Cisco Systems, Inc. of San Jose, Calif. Moreover, in a preferred embodiment, the Mobile Router of this invention may be a specially configured router such as specially configured router model 3200 available from Cisco Systems, Inc. of San Jose, Calif. A general structure for some of these machines will appear from the description given below.

Generally, the route optimization technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid route optimization system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the roaming systems of this invention may be specially configured routers such as specially configured router models 350, 1100, 1200, 1400, 1600, 2500, 2600, 3200, 3600, 4500, 4700, 7200, 7500, and 12000 available from Cisco Systems, Inc. of San Jose, Calif. A general architecture for some of these machines will appear from the description given below. In an alternative embodiment, the route optimization system may be implemented on a general-purpose network host machine such as a personal computer or workstation. Further, the invention may be at least partially implemented on a card (e.g., an interface card) for a network device or a general-purpose computing device.

Figure 10:
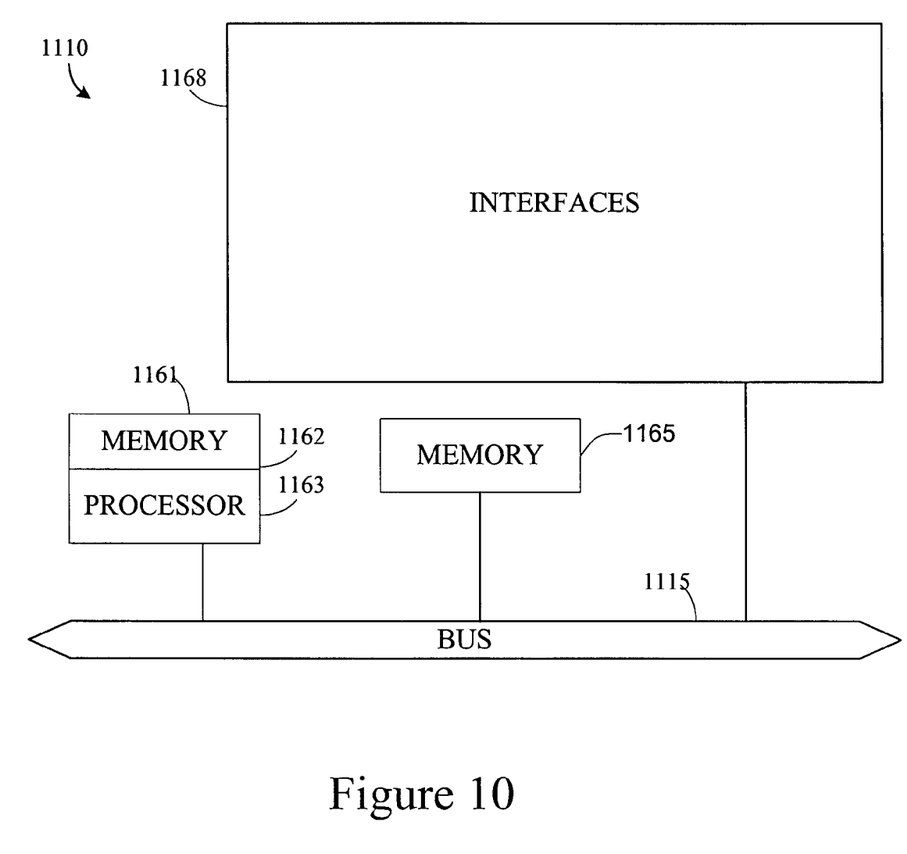
FIG. 10 is a diagrammatic representation of a router in which embodiments of the present invention may be implemented.

Referring now to FIG. 10, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 10 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, the disclosed message formats are merely illustrative, and therefore other messages may be used to establish route optimization. Moreover, although the example described refers to IPv6, the present invention may be used with IP addresses that conform to other versions of IP. Therefore, the described embodiments should be taken as illustrative and not restrictive, and the invention should not be limited to the details given herein but should be defined by the following claims and their full scope of equivalents.

What is claimed is:

1. In a Mobile Router supporting Mobile IP, the Mobile Router having one or more networks associated therewith, a method of establishing a route between one or more nodes associated with one of the networks of the Mobile Router and a Correspondent Node, the method comprising:

composing a Home Test Init (HOTI) message on behalf of at least one of the nodes, the HOTI message including a care-of address field identifying a care-of address of the Mobile Router and a Home Address field identifying a Home Address of the one of the nodes, wherein the one of the nodes is a node that does not support Mobile IP;

sending the HOTI message from the Mobile Router to a Correspondent Node via a Home Agent supporting the Mobile Router;

sending a Care-of Test Init (COTI) message to the Correspondent Node on behalf of the at least one of the nodes, the COTI message including a care-of address field identifying the care-of address of the Mobile Router and a Home Address field identifying the Home Address of the one of the nodes;

receiving a Home Test (HOT) message from the Correspondent Node; receiving a Care-of Test (COT) message from the Correspondent Node;

automatically sending a binding update message to the Correspondent Node, wherein the binding update message identifies a home address of the one of the nodes; and receiving a binding acknowledgement message from the Correspondent Node, thereby enabling a binding between the one of the nodes and the Correspondent Node to be generated such that data packets transmitted between the one of the nodes and the Correspondent Node can be routed between the one of the nodes and the Correspondent Node without being routed via the Home Agent.

2. The method as recited in claim 1, further comprising:
creating a binding between the one of the nodes and the Correspondent Node.

3. The method as recited in claim 2, wherein the binding is a binding cache entry.

4. The method as recited in claim 1, wherein the binding update message comprises a care-of address field identifying the care-of address of the Mobile Router and a Home Address field identifying the home address of the one of the nodes.

5. The method as recited in claim 1, wherein the binding acknowledgement message comprises a care-of address field identifying the care-of address of the Mobile Router.

6. The method as recited in claim 1, wherein the HOTI message further comprises a home network prefix identifying a network prefix of the Mobile Router, thereby enabling a binding to be created between the network prefix and the Correspondent Node.

7. The method as recited in claim 6, wherein the COTI message further comprises the home network prefix identifying a network prefix of the Mobile Router, thereby enabling a binding to be created between the network prefix and the Correspondent Node.

8. The method as recited in claim 7, wherein the binding update message comprises the home network prefix identifying a network prefix of the Mobile Router, thereby enabling the Correspondent Node to create a binding cache entry for the network prefix.

9. The method as recited in claim 1, further comprising:
receiving a data packet from the Correspondent Node, the data packet including a Home Address option identifying the Home Address of the one of the nodes;
confirming that the Home Address corresponds to a node on a link of the Mobile Router or the Mobile Router;
removing the Home Address option from the data packet;
modifying a destination address of the data packet to the Home Address of the one of the nodes; and
forwarding the modified data packet to the Home Address of the one of the nodes.

10. The method as recited in claim 1, further comprising:
intercepting a data packet sent from the one of the nodes to the Correspondent Node;
adding a Home Address destination option identifying the Home Address of the one of the nodes obtained from a source address field of the data packet to the data packet;
modifying a source address of the data packet to a Home Address of the Mobile Router; and
forwarding the modified data packet to the Correspondent Node.

11. The method as recited in claim 1, further comprising:
intercepting a data packet sent from the one of the nodes to the Correspondent Node, wherein the Mobile Router initiates HOTI messaging by composing a HOTI message when the data packet is received.

12. The method as recited in claim 1, further comprising:
intercepting data packets sent between the Correspondent Node and the one of the nodes.

13. The method as recited in claim 1, further comprising:
receiving a data packet from a Correspondent Node, the data packet including a routing header type 2 option containing the home address of the one of the nodes;
removing the routing header type 2 option from the data packet;
modifying a destination address of the data packet to be the home address of the one of the nodes identified in the routing header type 2 option; and
forwarding the modified data packet to the one of the nodes.

14. In a Correspondent Node, a method of establishing a route between the Correspondent Node and one or more nodes associated with one of a plurality of networks associated with a Mobile Router, comprising:
receiving a HOTI message from the Mobile Router via a Home Agent supporting the Mobile Router, the HOTI message including a care-of address field identifying a care-of address of the Mobile Router and a Home Address field identifying a Home Address of the one of the nodes, wherein the one of the nodes does not support Mobile IP;
receiving a COTI message from the Mobile Router, the COTI message including a care-of address field identifying the care-of address of the Mobile Router and a Home Address field identifying the Home Address of the one of the nodes;
sending a HOT message to the Mobile Router;
sending a COT message to the Mobile Router;
receiving a binding update message from the Mobile Router, wherein the binding update message identifies a home address of the one of the nodes; and
sending a binding acknowledgement message to the Mobile Router, thereby enabling a binding between the one of the nodes and the Correspondent Node to be generated such that data packets transmitted between the one of the nodes and the Correspondent Node can be routed between the one of the nodes and the Correspondent Node without being routed via the Home Agent.

15. The method as recited in claim 14, wherein the HOTI message further comprises a home network prefix identifying a network prefix of the Mobile Router, thereby enabling a binding to be created between the network prefix and the Correspondent Node.

16. The method as recited in claim 15, wherein the COTI message further comprises the home network prefix identifying a network prefix of the Mobile Router, thereby enabling a binding to be created between the network prefix and the Correspondent Node.

17. The method as recited in claim 16, wherein the binding update message comprises the home network prefix identifying a network prefix of the Mobile Router, thereby enabling the Correspondent Node to create a binding cache entry for the network prefix.

18. The method as recited in claim 17, further comprising:
generating a binding cache entry for the network prefix.

19. The method as recited in claim 17, further comprising:
sending a data packet to one of the nodes using the binding cache entry.

20. The method as recited in claim 17, further comprising:
consulting the binding cache entry for a longest prefix match between a network prefix of a destination address; and
sending a data packet to the destination address associated with one of the nodes via an optimized route identified in the binding cache entry.

21. A non-transitory computer-readable medium storing thereon computer-readable instructions establishing a route between one or more nodes associated with one of one or more networks of a Mobile Router supporting Mobile IP and a Correspondent Node, comprising:
instructions for composing a HOTI message on behalf of at least one of the nodes, the HOTI message including a care-of address field identifying a care-of address of the Mobile Router and a Home Address field identifying a Home Address of the one of the nodes, wherein the one of the nodes does not support Mobile IP;
instructions for sending the HOTI message from the Mobile Router to a Correspondent Node via a Home Agent supporting the Mobile Router;

instructions for sending a COTI message to the Correspondent Node on behalf of the at least one of the nodes, the COTI message including a care-of address field identifying the care-of address of the Mobile Router and a Home Address field identifying the Home Address of the one of the nodes;

instructions for receiving a HOT message from the Correspondent Node;

instructions for receiving a COT message from the Correspondent Node;

instructions for sending a binding update message to the Correspondent Node, wherein the binding update message identifies a home address of the one of the nodes; and instructions for receiving a binding acknowledgement message from the Correspondent Node, thereby enabling a binding between the one of the nodes and the Correspondent Node to be generated such that data packets transmitted between the one of the nodes and the Correspondent Node can be routed between the one of the nodes and the Correspondent Node without being routed via the Home Agent.

22. The non-transitory computer-readable medium as recited in claim 21, wherein the binding update message comprises a care-of address field identifying the care-of address of the Mobile Router and a Home Address field identifying the home address of the one of the nodes.

23. The non-transitory computer-readable medium as recited in claim 22, wherein the binding acknowledgement message comprises a care-of address field identifying the care-of address of the Mobile Router.

24. The non-transitory computer-readable medium as recited in claim 21, wherein the HOTI message further comprises a home network prefix identifying a network prefix of the Mobile Router, thereby enabling a binding to be created between the network prefix and the Correspondent Node.

25. The non-transitory computer-readable medium as recited in claim 24, wherein the COTI message further comprises the home network prefix identifying a network prefix of the Mobile Router, thereby enabling a binding to be created between the network prefix and the Correspondent Node.

26. The non-transitory computer-readable medium as recited in claim 21, wherein the binding update message comprises a home network prefix identifying a network prefix of the Mobile Router, thereby enabling the Correspondent Node to create a binding cache entry for the network prefix.

27. A Mobile Router supporting Mobile IP, the Mobile Router having one or more networks associated therewith and adapted for establishing a route between one or more nodes associated with one of the networks of the Mobile Router and a Correspondent Node, comprising:

means for composing a HOTI message on behalf of at least one of the nodes, the HOTI message including a care-of address field identifying a care-of address of the Mobile Router and a Home Address field identifying a Home Address of the one of the nodes, wherein the one of the nodes does not support Mobile IP;

means for sending the HOTI message from the Mobile Router to a Correspondent Node via a Home Agent supporting the Mobile Router;

means for sending a COTI message to the Correspondent Node on behalf of the at least one of the nodes, the COTI message including a care-of address field identifying the care-of address of the Mobile Router and a Home Address field identifying the Home Address of the one of the nodes;

means for receiving a HOT message from the Correspondent Node;

means for receiving a COT message from the Correspondent Node;

means for sending a binding update message to the Correspondent Node, wherein the binding update message identifies a home address of the one of the nodes; and means for receiving a binding acknowledgement message from the Correspondent Node, thereby enabling a binding between the one of the nodes and the Correspondent Node to be generated such that data packets transmitted between the one of the nodes and the Correspondent Node can be routed between the one of the nodes and the Correspondent Node without being routed via the Home Agent.

28. A Mobile Router supporting Mobile IP, the Mobile Router having one or more networks associated therewith and adapted for establishing a route between one or more nodes associated with one of the networks of the Mobile Router and a Correspondent Node, comprising:

a processor; and a memory, at least one of the processor or the memory being configured to:

composing a HOTI message on behalf of at least one of the nodes, the HOTI message including a care-of address field identifying a care-of address of the Mobile Router and a Home Address field identifying a Home Address of the one of the nodes, wherein the one of the nodes does not support Mobile IP;

sending the HOTI message from the Mobile Router to a Correspondent Node via a Home Agent supporting the Mobile Router;

sending a COTI message to the Correspondent Node on behalf of the at least one of the nodes, the COTI message including a care-of address field identifying the care-of address of the Mobile Router and a Home Address field identifying the Home Address of the one of the nodes;

receiving a HOT message from the Correspondent Node;

receiving a COT message from the Correspondent Node;

sending a binding update message to the Correspondent Node, wherein the binding update message identifies a home address of the one of the nodes; and receiving a binding acknowledgement message from the Correspondent Node, thereby enabling a binding between the one of the nodes and the Correspondent Node to be generated such that data packets transmitted between the one of the nodes and the Correspondent Node can be routed between the one of the nodes and the Correspondent Node without being routed via the Home Agent.

29. The Mobile Router as recited in claim 28, at least one of the processor or the memory being further adapted for performing steps comprising:

receiving a data packet from the Correspondent Node, the data packet including a Home Address option identifying the Home Address of the one of the nodes;

confirming that the Home Address corresponds to a node on a link of the Mobile Router or the Mobile Router;

removing the Home Address option from the data packet;

modifying a destination address of the data packet to the Home Address of the one of the nodes; and forwarding the modified data packet to the Home Address of the one of the nodes.

30. The Mobile Router as recited in claim 28, at least one of the processor or the memory being further adapted for performing steps comprising:

intercepting a data packet sent from the one of the nodes to the Correspondent Node;
adding a Home Address destination option identifying the Home Address of the one of the nodes obtained from a source address field of the data packet to the data packet;
modifying a source address of the data packet to a Home Address of the Mobile Router; and
forwarding the modified data packet to the Correspondent Node.

31. The Mobile Router as recited in claim 28, at least one of the processor or the memory being further adapted for performing steps comprising:
intercepting a data packet sent from the one of the nodes to the Correspondent Node, wherein the Mobile Router initiates HOTI messaging by composing a HOTI message when the data packet is received.

32. The Mobile Router as recited in claim 28, at least one of the processor or the memory being further adapted for performing steps comprising:
intercepting data packets sent between the Correspondent Node and the one of the nodes.

33. The Mobile Router as recited in claim 28, at least one of the processor or the memory being further adapted for performing steps comprising:
receiving a data packet from a Correspondent Node, the data packet including a routing header type 2 option containing the home address of the one of the nodes;
removing the routing header type 2 option from the data packet;
modifying a destination address of the data packet to be the home address of the one of the nodes identified in the routing header type 2 option; and
forwarding the modified data packet to the one of the nodes.

* * * * *